United States Patent [19]

Luchaco et al.

[11] Patent Number: 5,357,170
[45] Date of Patent: Oct. 18, 1994

[54] LIGHTING CONTROL SYSTEM WITH PRIORITY OVERRIDE

[75] Inventors: David G. Luchaco, Macungie; James M. Yorgey, Allentown, both of Pa.

[73] Assignee: Lutron Electronics Co., Inc., Coopersburg, Pa.

[21] Appl. No.: 16,632

[22] Filed: Feb. 12, 1993

[51] Int. Cl.$^5$ .......................................... H05B 37/02
[52] U.S. Cl. ................... 315/159; 315/149; 315/154; 315/158; 315/302; 315/DIG. 4
[58] Field of Search ............ 315/159, 149, 154, 158, 315/291, 302, 307, DIG. 4

[56] References Cited

U.S. PATENT DOCUMENTS

| 4,139,801 | 2/1979 | Linares | 315/159 |
| 4,461,977 | 7/1984 | Pierpoint et al. | 315/159 |
| 5,155,415 | 10/1992 | Schmidt | 315/159 |

*Primary Examiner*—Robert J. Pascal
*Assistant Examiner*—Reginald A. Ratliff
*Attorney, Agent, or Firm*—Warren W. Kurz

[57] ABSTRACT

An energy-saving lighting control system is selectively operable in either a normal mode, in which certain lighting parameters (e.g., maximum and minimum light levels, fade rates, etc.) are preset and lighting level is determined by which of a plurality of inputs requires the least electrical power, or in an off-normal mode (e.g., a calibration or light-adjustment mode) in which certain parameters are adjustable by manually adjusting the position of a movable member, such as a wiper blade in a potentiometer. A microprocessor-based logic and control unit is adapted to automatically switch from the normal operating mode to the off-normal mode in response to movement of the movable member. After a predetermined time period following the most recent movement of the movable member, the logic and control unit stores the new level of the adjusted parameter, and returns to the normal operating mode. Preferably, the system has multiple outputs by which different types of fluorescent lamp ballasts can be controlled.

14 Claims, 6 Drawing Sheets

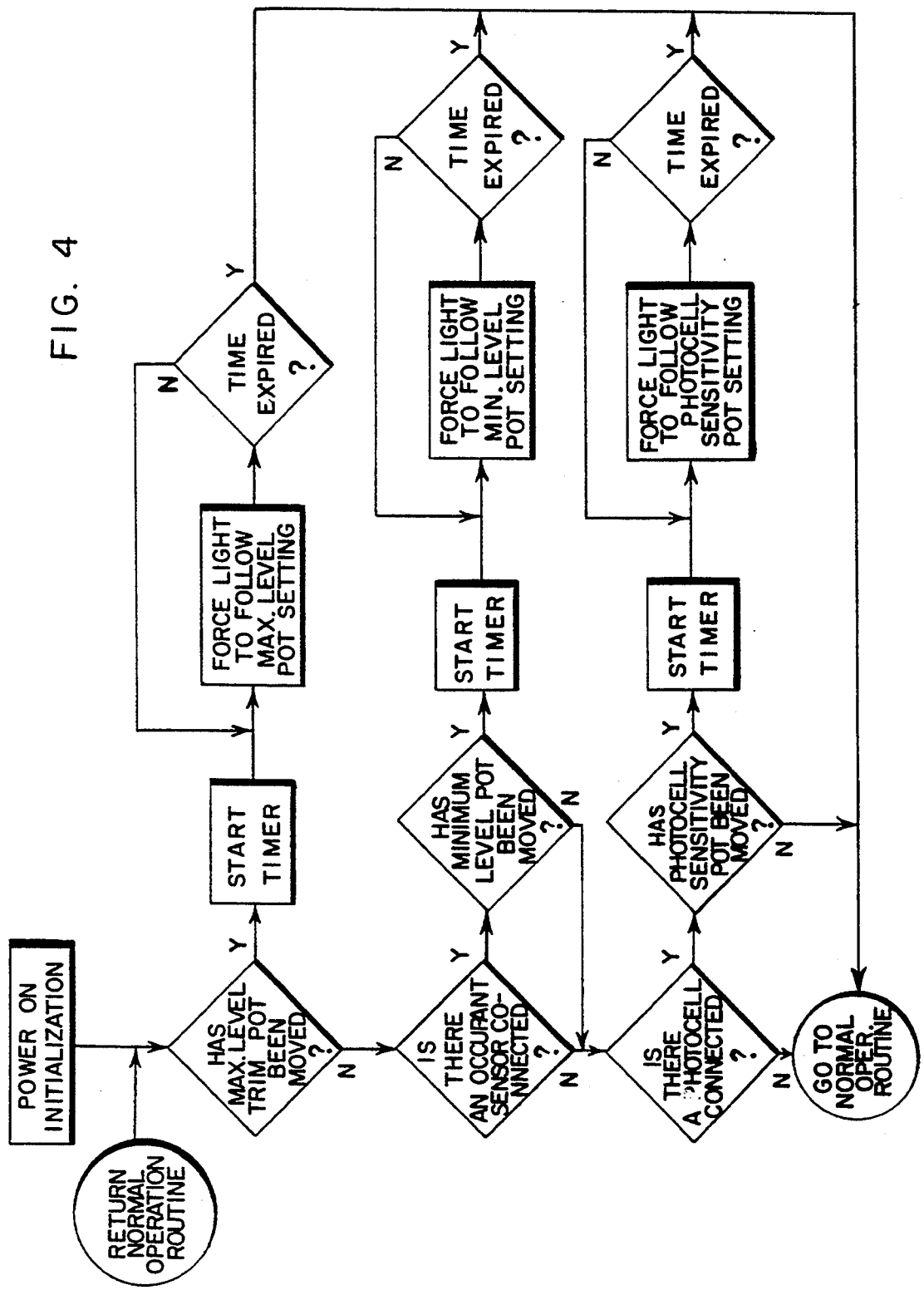

LIGHTING CONTROL SYSTEM WITH PRIORITY OVERRIDE

BACKGROUND OF THE INVENTION

1. Field of the Invention

The present invention relates to improvements in lighting control systems of the type which automatically adjust the level of lighting in a room or the like based on predetermined needs of the user.

2. The Prior Art

Various lighting control systems have been devised and commercialized which automatically adjust the level of artificial lighting in a room to minimize energy consumption while satisfying the lighting needs of the occupant or room user. Such systems often comprise, for example, an occupant sensor, such as a conventional passive infrared or Doppler device, which operates to produce a control signal for a predetermined time interval after sensing the presence of a room occupant. Typically, a lighting control circuit responds to an interruption of this control signal to turn the room lighting off, thereby conserving energy when the room is determined by the sensor to be unoccupied. Such energy-saving lighting control systems may also include a photosensor which operates to produce an analog control signal based on the level of natural (daylight) lighting in the room. In response to this signal, the lighting control circuit adjusts the level of artificial light (e.g., as provided by fluorescent and/or incandescent lamps) such that the combination of natural and artificial light meets the needs of the user.

In addition to an occupant sensor and/or a photosensor, conventional energy-saving lighting control systems commonly include a dimming system by which the light level in a room can be manually adjusted. Such a dimming system comprises a manually movable actuator, such as a slider or a rotatable knob, which operates to adjust a potentiometer setting and thereby vary a lighting control signal based on its physical position.

In conventional systems of the above type, logic circuitry determines which of the various control signals has priority in controlling the brightness of the lamps. Generally, the controlling algorithm is that the control signal requiring the least light level has priority. Thus, should the control signal provided by the manually movable actuator require 50% lamp brightness while the occupant sensor control signal requires 0% lamp brightness (indicating that the room is unoccupied), the logic circuit will normally set the lamp brightness at zero. Similarly, if the room is occupied and the photosensor output requires 80% lamp brightness while the manually movable actuator is set for 60%, the logic circuit will set the lamp brightness at 60%, assuming an occupant sensor, if used, requires no less than 60% lamp brightness. Lighting control systems of this type are sold, for example, by Lithonia Control Systems under the trademark Equinox, and by Honeywell, Model EL 7305A1010, Electronic Ballast Controller.

Heretofore, decision-making in the energy-saving lighting control systems of the prior art has been achieved by logic circuitry comprising discrete operational amplifiers and impedance elements. Not being programmable, such circuitry has little flexibility in the features it offers. For example, there is no easy way to precisely adjust the maximum and minimum levels to which the lighting can be set; such circuitry usually operates to adjust the light level between full ON or full OFF. This is disadvantageous when a user desires to always have some minimum light level in an unoccupied room or hallway, or desires to operate the room lights at less than full power to conserve energy and prolong lamp life. Also, the normal output of such control circuitry cannot be readily overridden to satisfy certain unusual or off-normal needs of the user. When, for example, the system is designed to turn off the lights in response to a signal from the occupant sensor indicating an unoccupied room, one who desires to turn on the lights in the unoccupied room by a wall box control would first have to be detected by the occupant sensor. Only after detecting a user's presence will the occupant sensor allow the room light to be controlled by a wallbox control. This can be especially annoying, for example, to maintenance and security personnel who may want to quickly check the status of a room by reaching into the room from outside and moving the wallbox mounted dimmer actuator. Often, the occupant sensor is incapable of detecting such a small signal or, if it can, it may not be capable of "seeing" all entrances from which the room lighting can be controlled by a wall control.

Further disadvantages of conventional energy-saving lighting control systems are: (1) they are not designed to respond to an "emergency ON" signal, as may be produced by a fire or security system; (2) they do not respond to a "load shed" signal indicating that lighting power consumption should be reduced, such as during periods of peak demand for electrical power companies; (3) they have no means for easily and conveniently calibrating the photosensor output; and (4) their outputs cannot control different types of fluorescent ballasts.

SUMMARY OF THE INVENTION

In view of the foregoing discussion, an object of this invention is to overcome the noted disadvantages of conventional energy-saving lighting control systems.

According to one aspect of this invention, there is provided a lighting control system which is operable in either a normal mode, in which certain lighting parameters (e.g., maximum and minimum light levels, fade rates, etc.) are preset, or in an off-normal mode (e.g., a calibration or light-adjustment mode) in which such parameters are adjustable by manually adjusting the position of a movable member, such as a wiper blade in a potentiometer. According to this aspect of the invention, a logic and control unit is adapted to automatically switch from the normal operating mode to the off-normal mode in response to movement of the movable member. Upon entering the off-normal mode, the logic and control unit operates to reduce all fade rates, preferably to zero, so that the user has substantially instantaneous feedback of any changes in light level, and to ignore any input conditions which would require a light level which is inconsistent with the instantaneous position of the movable member. Preferably, after a predetermined time period following the most recent movement of the movable member, the logic and control unit stores the new level of the adjusted parameter, and returns to the normal operating mode.

According to another aspect of the invention, there is provided a lighting control system for controlling the brightness of a lamp in accordance with the minimum lighting needs of an environment in which the lamp is used, such system comprising:

(a) adjustable control means for producing a first signal having a value representing a first desired lamp brightness, such adjustable control means having a manually movable actuator for selectively determining the value of the first signal;

(b) occupant-sensing means for sensing the presence (or absence) of a human being in the environment and, in response to detecting such presence (or absence), for selectively producing a second signal having a value representing a second desired lamp brightness; and (c) a logic and control unit comprising: (i) means for comparing the respective values of the first and second signals and for producing an output signal to cause the lamp to operate at the lower of the first and second desired lamp brightnesses, and (ii) means responsive to movement of the lighting control actuator for overriding the output of the comparing means to cause the lamp brightness to be determined only by the first signal.

According to a third aspect of this invention, there is provided a lighting control system which comprises:

(a) adjustable control means for producing a first signal having a value representing a first desired lamp brightness, such adjustable control means having a manually movable actuator for selectively determining the value of the first signal;

(b) occupant-sensing means for sensing the presence (or absence) of a human being in the environment and, in response to detecting such presence (or absence), for selectively producing a second signal having a value representing a second desired lamp brightness; and (c) a logic and control unit comprising: (i) means for comparing the respective values of the first and second signals and for producing an output signal to cause the lamp to operate at the lower of the first and second desired lamp brightnesses, and (ii) means responsive to a third signal indicating a need for maximum lamp brightness for overriding the output of the comparing means to cause the lamp brightness to be determined only by the third signal.

According to a fourth aspect of the invention, there is provided an improved energy-saving lighting control system having multiple outputs for controlling the operation of different fluorescent dimming ballasts.

According to a fifth aspect of the invention, there is provided an energy-saving lighting control system in which an "off-hours" input from a time clock overrides an occupant sensor input requiring a preset lighting level for an unoccupied room.

According to a sixth aspect of the invention, the lighting control system of the invention provides a unique after hours override sequence by which the controlled lights are flashed to alert a user that they are soon to be turned off, and then reduced to a predetermined fraction of their original light level to provide sufficient lighting for safe egress.

The invention and its various advantages will be better understood from the ensuing detailed description of a preferred embodiment, reference being made to the accompanying drawings.

BRIEF DESCRIPTION OF THE DRAWINGS

FIG. 4 is a flow chart illustrating a preferred sub-routine carried out by the microprocessor of the lamp controller.

DETAILED DESCRIPTION OF A PREFERRED EMBODIMENT

Figure 1:
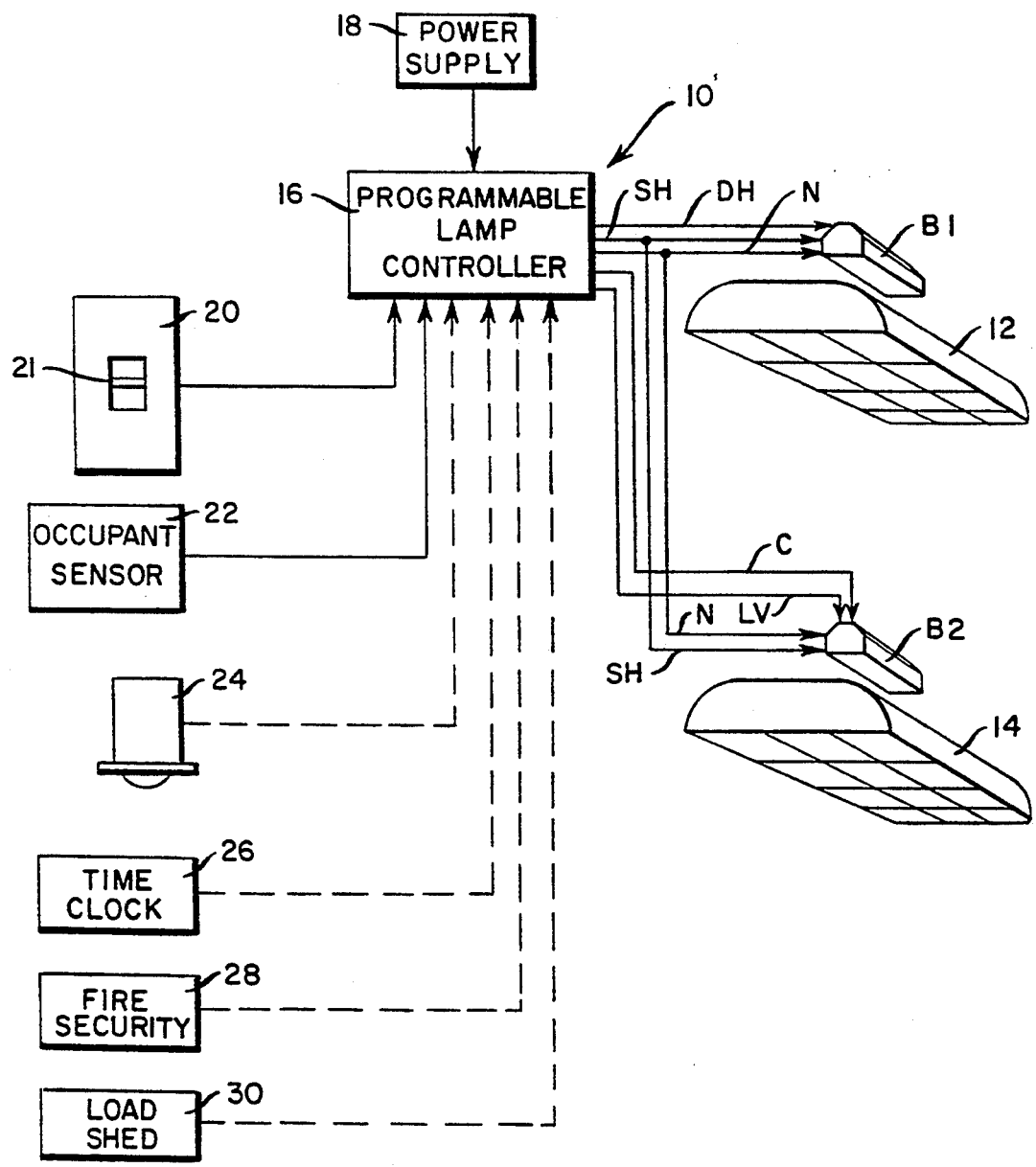
FIG. 1 is schematic illustration of a lighting control system embodying the present invention.

Referring now to the drawings, FIG. 1 schematically illustrates an energy-saving lighting control system 10 which is particularly well adapted to control the level of lighting provided by a pair of fluorescent lamp fixtures 12 and 14. For the sake of illustration, only two fixtures are shown in the drawings, it being understood that a significantly larger number (e.g. as many as 50 two-lamp fixtures) can be controlled by the output of the system. The respective levels of lighting provided by lamp fixtures 12 and 14 are controlled by the respective outputs of fluorescent dimming ballasts B-1 and B-2 which operate under the control of a programmable lamp controller, described below. To illustrate the flexibility of the system, two entirely different types of fluorescent dimming ballasts are indicated, B-1 being of the type that adjusts lamp intensity or brightness based on signals carried on three high voltage wires (i.e., neutral, N; switched hot, SH; and dimmed hot, DH), and B-2 being of the type that adjusts lamp intensity based on signals carried on two high voltage wires (i.e., N and SH) and two low voltage wires, common C and low voltage signal LV. The Hi-lume fluorescent lamp ballast, manufactured by Lutron Electronics Co., Inc., is exemplary of the B-1 ballast, and the Mark VII fluorescent lamp ballast, manufactured by Advance Transformer Co., is exemplary of the B-2 ballast. Typically, the high voltage hot wire varies between 100 and 277 volts AC, and the low voltage signal wire varies between 2 and 10 volts DC. Unlike the prior art systems discussed above, the lighting control system of the invention can control either or a combination of both types of ballasts. Being microprocessor controlled, the system of the invention can be readily programmed to provide various features not heretofore considered in a product of this type.

System 10 comprises a microprocessor-based lamp controller 16 which is adapted to receive power from an AC power source 18. The latter may vary in voltage between 100 and 277 volts, and may be either 50 or 60 hertz. The dimming ballast output of lamp controller 10 is determined by a plurality of input signals which are provided, for example, by a wall box control 20, an occupant sensor 22, a photosensor 24, a time clock 26, a fire/security sensor 28 and a load shed sensor 30. With the exceptions noted below, the input that requires the least energy consumption is the input that controls the lamp controller output. Input devices of the above type are well known; thus, only those particulars that relate to the invention will be mentioned. It suffices to say that the wall box dimmer control comprises a movable actuator 21 (shown as a slider, but might just as well be a rotary member) whose physical position determines the impedance of a potentiometer which, in turn determines the output voltage (e.g. 0–10 volts) of the control. When the actuator is at one extreme of its allowed range of movement, the wall control requests zero light, and when it is at its other extreme, it requests maximum light. The maximum light level may be adjusted by means of trimming potentiometers 50, shown in FIG. 2.

A suitable wall control is disclosed, for example in the commonly assigned U.S. Pat. No. 4,742,188, issued on May 3, 1988.

Occupant sensor 22 may be of the conventional passive infrared variety which produces a fixed (i.e., constant amplitude) output signal upon sensing a change in ambient temperature on a pyroelectric sensor pair. Such a change is produced by the body heat of a person moving within the room containing the controlled lamps. Sensor 22 may also comprise a microwave or ultrasonic detection system which operates on the well-known Doppler effect to sense occupancy. Whatever the technology, the output of the occupant sensor is either high or low, indicating occupancy or no occupancy. When the area to be illuminated (which is usually referred to herein as a "room", but it will be understood that the area need not be bounded by walls) is occupied, the sensor output usually requests a preset maximum light level. Again, this maximum level is adjustable by the setting of trim pot 50. When the room is not occupied, the occupant sensor output requests a preset light minimum level which is adjustable by setting trim pot 52. Alternatively, if a time clock (discussed below) indicates an after hours condition, the value of the unoccupied light level can be different from that set by trim pot 52 (e.g., the lights may be turned off, independent of the setting of trim pot 52).

Photosensor 24 merely comprises a sunlight-responsive photosensitive element which is adapted to produce a low voltage signal (e.g. 1–10 volts DC) in response to the level of daylight it receives. Time clock 26, fire/security sensor 28 and load shed detector 30 are simply on/off switches that provide a high or low input to the lamp controller input to which they are attached.

Figure 2:
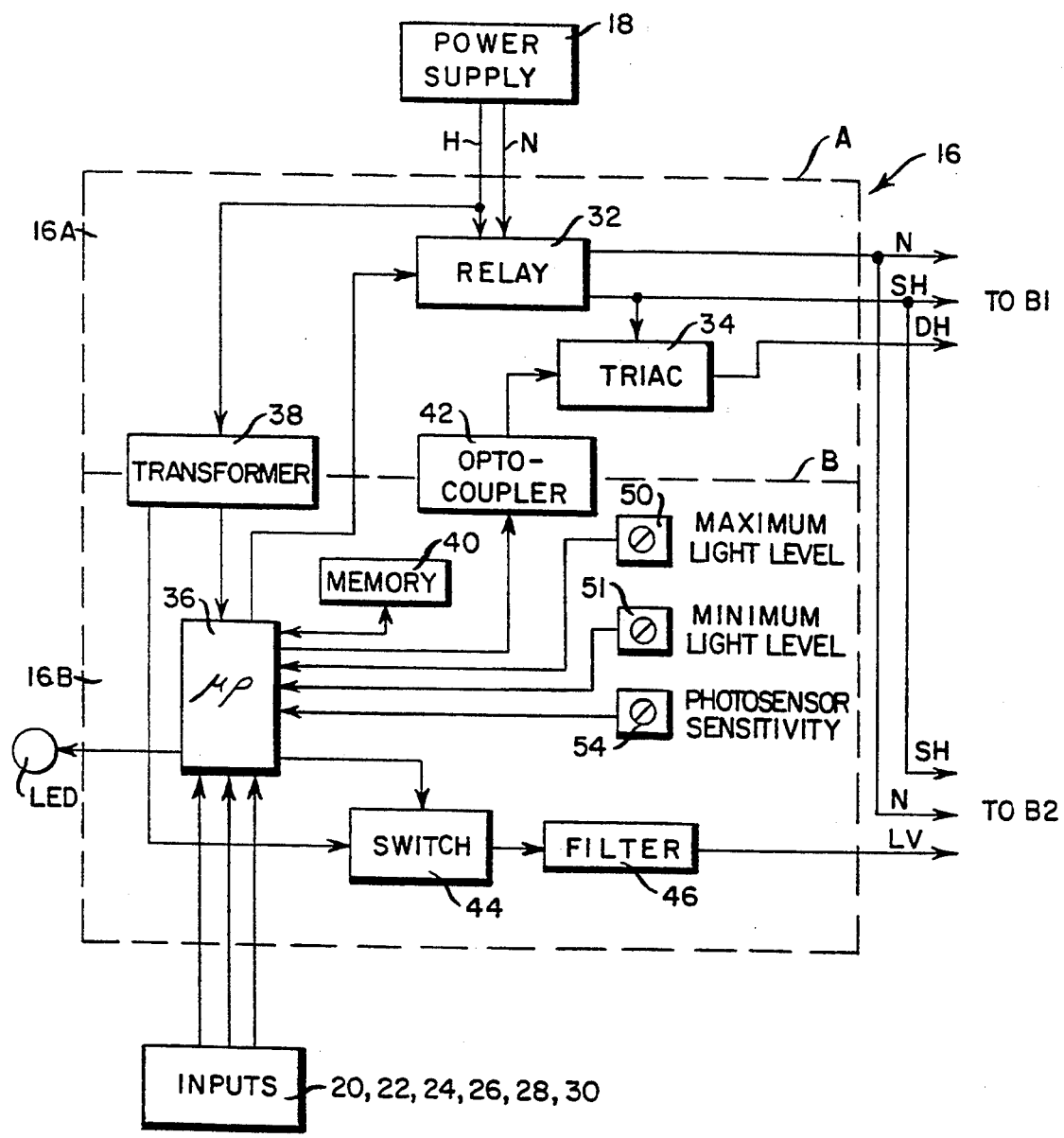
FIG. 2 is an electrical block diagram illustrating various components of the lamp controller shown in FIG. 1.

Referring to FIG. 2, programmable lamp controller 16 is schematically illustrated as comprising a housing H having a barrier B which defines a high voltage section 16A, and a low voltage section 16B. The high voltage section is adapted to receive line voltage signals from the AC power supply 18. It contains a relay 32 through which AC power is selectively applied to the lamp ballasts, and an electronic switch, shown as triac 34, through which a dimmed hot signal is supplied to the B-1 ballasts. Triac 34 operates under the control of a microprocessor 36 which controls the overall operation of the lamp controller. Low voltage (e.g. 5 volts) power is supplied to the microprocessor via a switch mode power supply which includes a Class 2 transformer 38. The microprocessor comprises a memory 40 which is suitably programmed to provide the operating features discussed below. A preferred microprocessor for controller 16 is the Model ST62E10, made by SGS Thompson Microelectronics Co. which is capable of accepting both analog and digital inputs. Microprocessor 36 operates to control the firing of triac 34 through a conventional opto-coupler 42. The microprocessor also operates to provide pulse-width modulation control of an electronic switch 44, preferably another opto-coupler, which, through a smoothing filter 46, provides a suitable low voltage control signal LV by which dimming ballast B2 is controlled. As illustrated, the microprocessor is adapted to receive at least six different input signals, some of a digital nature (e.g., inputs 22, 26, 28 and 30), and others being of an analog nature (e.g., inputs 20 and 24).

The energy-saving lighting control system described above is programmed to provide several unique features. First, whenever the actuator 21 of wall control 20 is moved, the controller's output (which is normally controlled by the input requiring the least energy) is overridden for a predetermined time, and the lighting level is determined by the position of the actuator, independent of the state of the time clock 26 or occupant sensor 22. Thus, even "after hours" when the time clock input is requesting that the lights be turned off, or when an occupant sensor is used and no occupant is sensed, movement of the wall control actuator will temporarily override the time clock and/or occupant sensor input and cause the lights to be turned on to the level indicated by the actuator position. Note, movement of the actuator can readily be determined by monitoring the state of the potentiometer to which the actuator is connected. This can be accomplished by comparing the voltage provided on the signal lead of the potentiometer with its value at some previous time, and by indicating movement when the two values differ by more than some preset value. Alternatively, actuator movement could be detected by the technique disclosed in the commonly assigned U.S. Pat. No. 4,987,372, issued on Jan. 22, 1991 to J. Ofori-Tenkorang, entitled "Potentiometer State Sensing Circuit", the disclosure of which is incorporated herein by reference. Preferably, the duration of the override period during normal or working hours is 30 seconds, after which the system returns to its normal mode of operation. This period is usually sufficient to allow security personnel, for example, to turn the room lights on momentarily without having to be concerned with changing the state of a time clock and/or occupant sensor input.

A second unique feature of the lighting control system of the invention, is that whenever any one of the trim pots 50, 52 and 54 is adjusted, the system automatically switches from its normal operating mode to an off-normal or "calibration" mode. Here again, movement of the pots can be detected by detecting variations in voltage, as mentioned above, or by the scheme disclosed in the aforementioned U.S. Pat. No. 4,987,372. In a calibration mode, the microprocessor ignores any and all of its pre-programmed fade rates (i.e. the rate at which one input produces a change in lighting level). These fade rates normally cause the light level to change very slowly in response to changes in the switch inputs so that so that the user is not subjected to abrupt and unpleasant lighting changes. However, during calibration, these slow variations are undesirable as the calibration process becomes time consuming, and it is difficult to achieve proper settings. By ignoring the normal fade rates during calibration, the person doing the calibration receives immediate lighting level feedback as the trim pots are adjusted. Also, by automatically switching to a calibration mode in response to adjustment of the trim pots, the preset lighting levels can be changed without having to activate a separate calibration switch which may not always be deactivated following re-calibration, and without having to manually set various input devices to specific states to allow adjustment of their respective effects. The microprocessor is programmed to return to the normal operating mode within a very short time (e.g. 3 to 5 seconds) following the completion of the most recent trim pot adjustment.

A third feature of the lighting control system of the invention is that it allows all inputs to be overridden in response to a "panic" call, such as produced by a closure of the fire/security switch 28.

A fourth feature of the invention is that the microprocessor has multiple outputs that are adapted to control entirely different types of fluorescent ballasts and dimming circuits. As noted earlier, the microprocessor outputs control switches 34 and 44 which, in turn, provide different control signals to the different ballasts.

Still another feature of the lighting control system of the invention is that it is adapted to be operated from different power sources, those most common in different countries of the world.

Figure 3A:
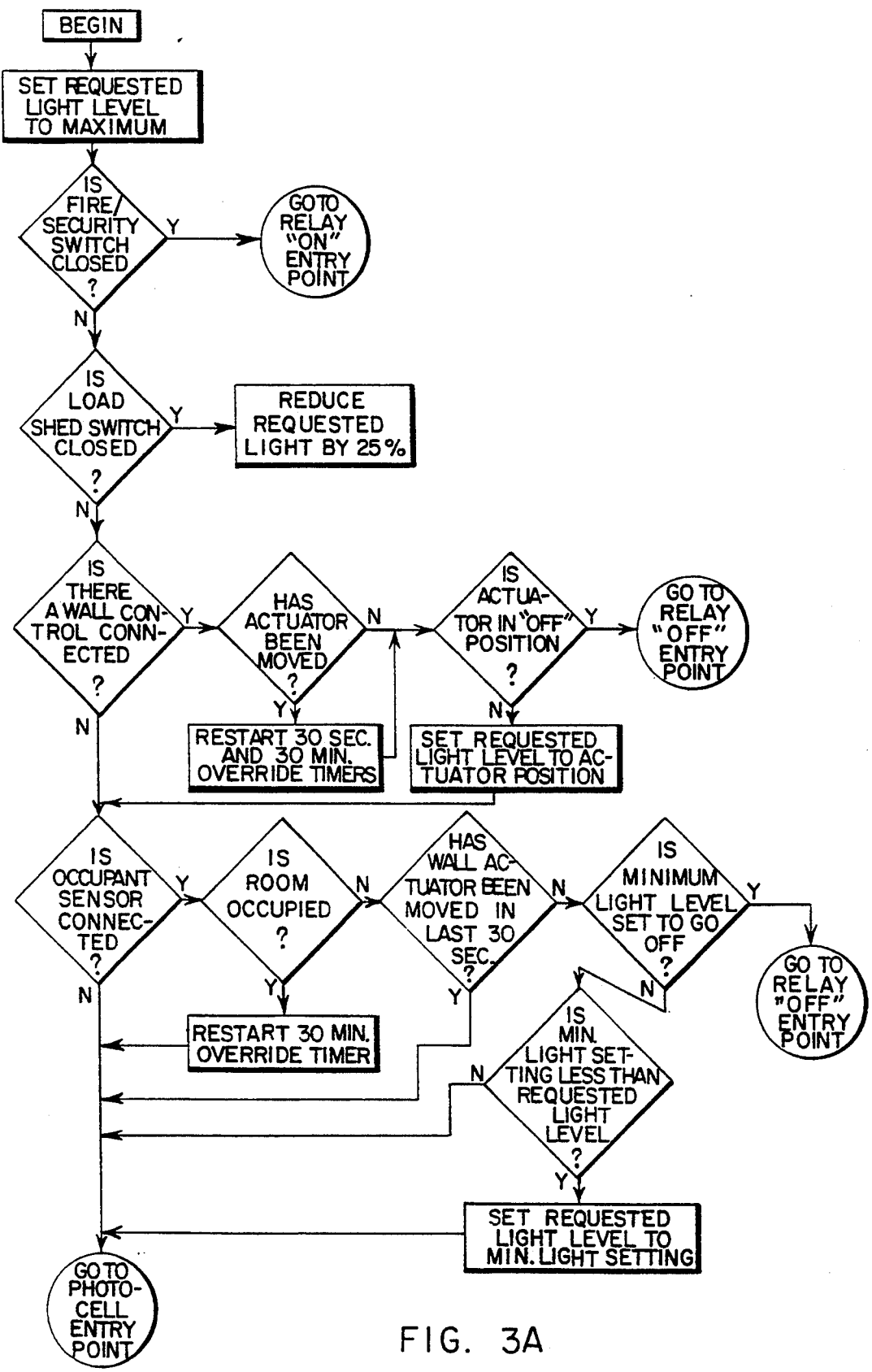
FIGS. 3A, 3B and 3C are flow charts which illustrate various steps of a preferred program carried out by the lamp controller's microprocessor.
Figure 3B:
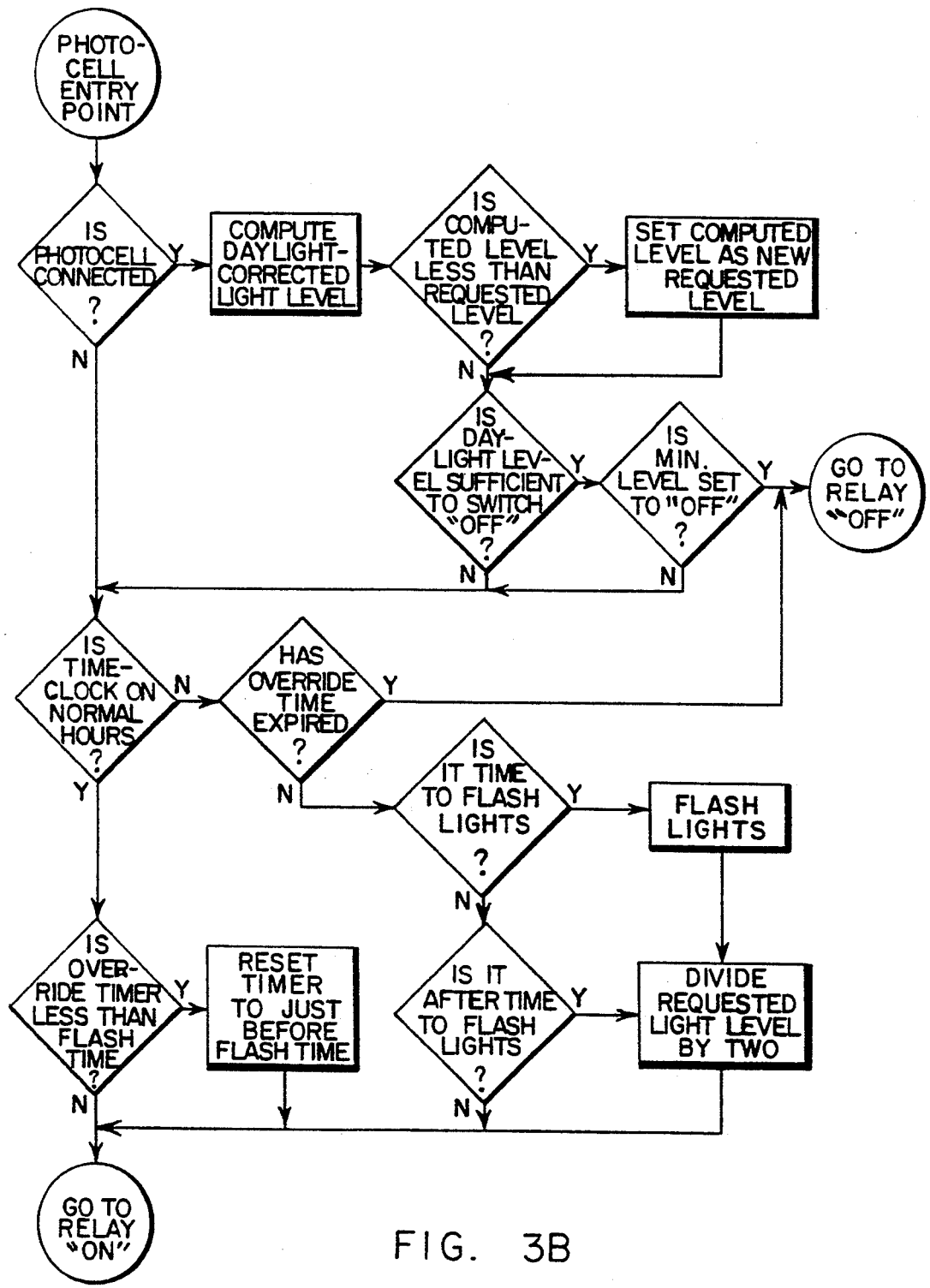
Figure 3C:
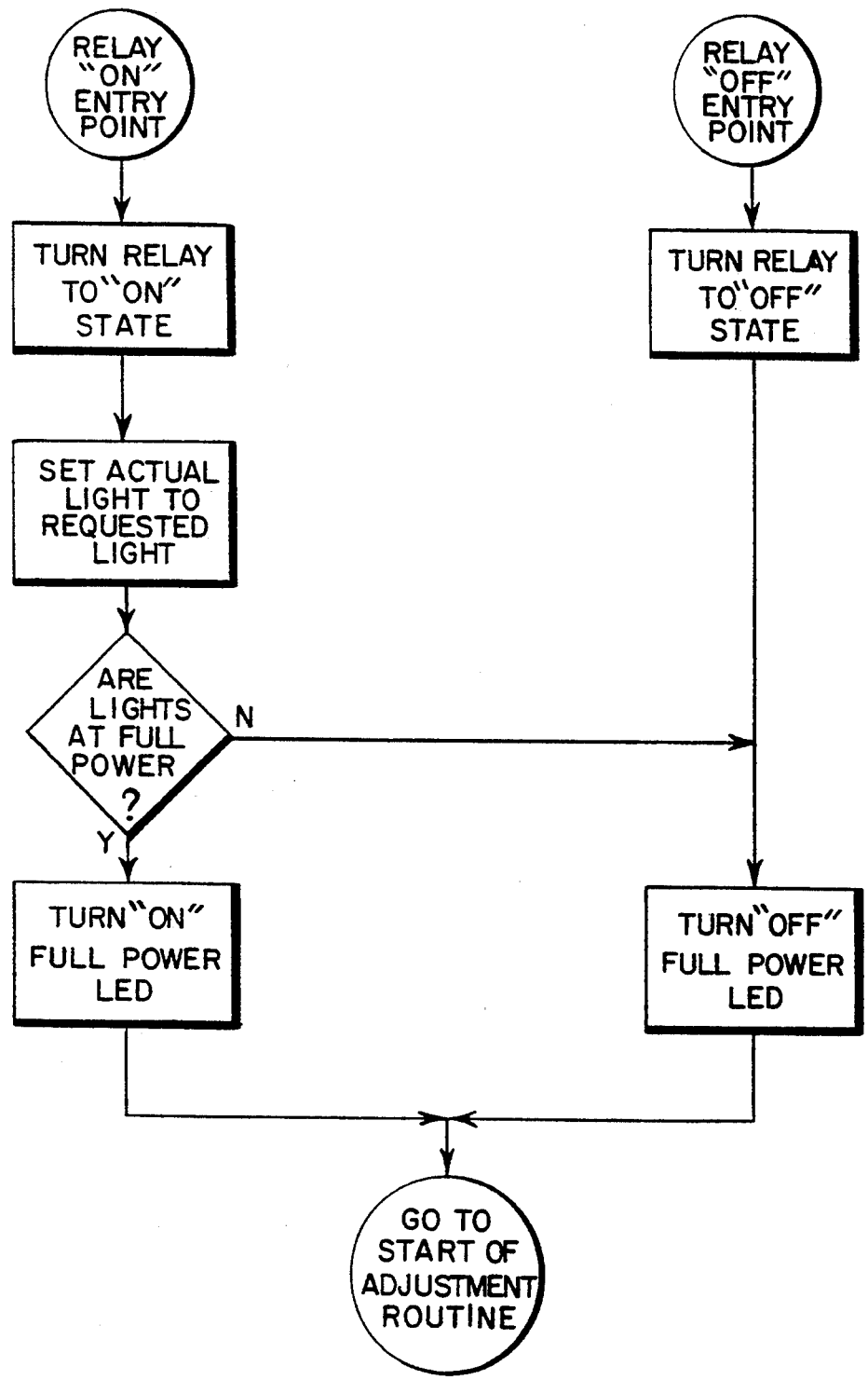

Referring now to FIGS. 3A-3C, a preferred program for providing the aforementioned features of the energy-saving lighting control system of the invention begins by setting the requested light level to the maximum level possible, as determined by the setting of trim pot 50, shown in FIG. 2. Thereafter, a determination is made whether the fire/security switch 28 is closed. If so, then the "Relay ON" routine, shown in FIG. 3C, is carried out, and relay 32 is energized so as to apply the set maximum power, which is the "requested power", to the lamps. If the maximum light level trim pot 50 is set to allow full (i.e., 100%) power to be applied to the lamps, then the full power light-emitting diode (LED) 60 is energized. If the lamps are not allowed to operate at full power, then the full power LED is turned off.

When the fire/security switch is open, as is normally the case, then the microprocessor proceeds to determine whether the load shed switch 30 is closed, indicating a peak power condition. If switch 30 is closed, then the microprocessor acts to reduce the power applied to the lamps by 25%, or by some other preset value which is stored in the microprocessor memory 40. If the load shed switch is open, the microprocessor then determines whether the lamps are controlled by a wall control unit 20.

When the microprocessor senses an input on its terminal reserved for a wall control unit, a determination is made whether the actuator 21 of such unit has been moved. Such a determination can be made by monitoring variations in signal voltage from actuator 21, or by other methods, such as that disclosed in the aforementioned U.S. Pat. No. 4,987,372. If the actuator is in the OFF position, then the relay 32 is turned OFF so that no power is applied to the lamps, and the routine shown in FIG. 3C is carried out. If the wall control actuator has been moved, then an override timer is started which enables the power applied to the lamps to be determined solely by the wall control input for a predetermined time period set by the timer. Note, during this override period, the wall control setting determines the lamp power, notwithstanding certain other inputs to the contrary (e.g., the time clock, occupant sensor or photosensor inputs that may require more or less power).

In the event a wall control 20 is either not connected or has been stationary for a predetermined time period and is requesting a certain level of light, the microprocessor next determines whether the occupant sensor 22 is connected and, if so, whether it has sensed that the room is occupied. If so connected and the room is occupied, a second override timer is started which enables the lighting to be set at the presently determined level for a predetermined time interval (e.g. 30 mins.). If the occupant sensor determines that the room is unoccupied, a determination is made whether the wall control actuator has been moved within a preceding short time period (e.g. 30 seconds). If so, the requested level is set to the level determined by the position of the wall control actuator. If not, the setting of the minimum level trim pot 52 is examined. If the minimum level of trim pot 52 is set to off, then relay 32 is turned off and no power is applied to the lamps. If, however, the minimum level trim pot 52 is set above zero light level, then a determination is made whether the minimum light setting is less than the requested level. If it is, then the requested light level is set to the minimum light setting. If the minimum light setting is greater than the requested light level, then the requested light level is left unmodified.

Having completed the above routine, the microprocessor determines whether a photocell is connected. If so, the microprocessor computes from the level of its input signal a daylight-corrected light level. That is, it determines what the lamp brightness must be so that, when added to the daylight brightness, the desired room brightness is achieved. A scheme for doing this is disclosed in the commonly assigned U.S. Pat. No. 4,236,101, issued on Nov. 25, 1980 to D. G. Luchaco, the disclosure of which is incorporated herein by reference. If the computed light level is less than the requested level, the latter is set to equal the computed level. Next, a determination is made whether the present level of daylight is sufficient to allow the lights to be completely switched off. If it is and the minimum level set by trim pot 52 is set to off, then relay 32 is turned off, and no power is applied to the lamps.

If the amount of daylight is insufficient to allow the lights to be switched off, or if the minimum level trimpot 52 is set to a value other than off, then the microprocessor determines whether time clock 26 indicates that the present time is off-normal (e.g., after normal working hours). If this is the case, then a determination is made whether the first and second override time intervals have expired. If so, the "Relay OFF" routine of FIG. 3C is followed. If not, the microprocessor then checks to see if the second override timer has reached a specific time somewhat before it is fully expired (e.g. about 5 minutes before expiration). If this is the case, the controller then warns any room occupant that the lights will be turned fully off in a short time by raising the lights to full for about 1 second, then lowering them to minimum for about one second. This ensures that the occupant will notice this "flash", even if the lights are already set at either full or minimum. Once the flash is completed, the system then further warns the occupant by reducing its light output to about one-half the value it had prior to the flash warning being given. This still allows enough light for any occupants to exit the room if they do not desire to remain.

In the case that the time clock input is in the normal hours state, the second override timer is again checked to see if it has reached the flash time point. However, in this state, the lights are not flashed, but the timer is simply reset to just a few seconds before the flash time, and operation then continues normally. In this way, when the time clock changes from normal to after hours, if the room has not been "used" (i.e. wall control moved or occupant sensor triggered to occupied state in the last 25 minutes), the flash warning occurs immediately, followed by 5 minutes at half light and full turn off. However, if someone had entered the room and either activated the wall control or tripped the occupant sensor just prior to the change of time clock state, the second override timer would have been reset to 30 minutes, and the occupant would have nearly the full override time to use the room before the flash warning could occur.

Referring now to FIG. 4, a preferred routine for switching from a normal mode of operation to a calibration mode without requiring the use of a separate calibration override switch begins by determining whether the maximum level trim pot 50 has been moved. Again, this determination can be made by observing voltage variations, or by using the potentiometer state-sensing technique disclosed in U.S. Pat. No. 4,987,372. If pot 50 has been "tweaked", a timer is started which times out in about 3 to 5 seconds. So long as the pot is adjusted within this time interval, the timer is repeatedly reset, and the maximum light level is forced to follow the instantaneous pot setting. In "forcing" this result, all fade times are ignored, as are any other input settings which would require a light level which is inconsistent with the light level set by the position of pot 50. After the timer times out, the microprocessor returns to its normal routine.

If the maximum level pot 50 has not been moved, a determination is made whether an occupant sensor is in use. If so, a determination is made of whether or not the minimum level trim pot 52 (which actually defines the maximum unoccupied level) has been moved. If so, another 3 to 5 second time period is initiated, during which time the light level is forced to follow the level set by the instantaneous position of the minimum level trim pot 52. Again, after the timer times out, the microprocessor returns to its normal routine.

If it was determined that pot 52 was never moved, the microprocessor then determines whether a photocell is connected to its designated input terminal. If so, the microprocessor then determines whether the photocell sensitivity pot has moved. If so, a 3 to 5 second time period is initiated during which time the light level is forced to follow the level determined by the photosensor output. After the timer times out, or a determination is made that no photocell is connected, the microprocessor returns again to its normal operation. This sub-routine is continuously repeated, as needed, to automatically switch between normal and calibration modes.

The invention has been described with reference to particularly preferred embodiments. This description, of course, should be viewed as illustrative, rather than limiting, inasmuch as many variations can be made without departing from the spirit of the invention.

What is claimed is:

1. A lighting control system comprising a logic and control unit which is selectively operable in either a normal mode, in which certain lighting parameters are preset, or in an adjustment mode, in which certain of said parameters are adjustable by manually adjusting the position of a movable member, said logic and control means being responsive to movement of said movable member to cause said logic and control unit to switch from its normal operating mode to its adjustable mode, said logic and control unit operating to change lighting levels at a preset rate when said logic and control unit is operating in its normal mode, to change lighting levels at a faster rate when operating in its adjustment mode.

2. The system as defined in claim 1 wherein said movable member comprises a wiper blade in a variable resistor.

3. The system as defined by claim 1 wherein said logic and control unit operates to ignore any input signals requesting light levels which are inconsistent with a light level determined by the instantaneous position of the movable member.

4. The system as defined by claim 1 wherein said logic and control unit operates to remember a light level produced by the last position of said movable member.

5. The system as defined by claim 1 wherein said logic and control unit causes said system to return to its normal operating mode after a predetermined time period following the most recent movement of said movable member.

6. A lighting control system for controlling the brightness of a lamp in accordance with the minimum lighting needs of an environment in which the lamp is used, said system comprising:
   (a) adjustable control means for producing a first signal having a value representing a first desired lamp brightness, said adjustable control means having a manually movable actuator for selectively determining the value of said first signal;
   (b) occupant-sensing means for sensing the absence of a human being in said environment and, in response to detecting such absence for a predetermined time interval, for selectively producing a second signal, said second signal having a value representing a second desired lamp brightness; and
   (c) a logic and control unit comprising (i) means for comparing the respective values of said first and second signals and for producing an output signal to cause the lamp to operate at the lower of the first and second desired lamp brightnesses, and (ii) means responsive to movement of said actuator for overriding the output of said comparing means to cause the lamp brightness to be determined only by said first signal, said logic and control means operating to change lighting levels at a preset rate when said second signal determines the desired lamp brightness, and at a faster rate when said first signal determines the desired lamp intensity.

7. The system as defined by claim 6 wherein said logic and control unit further comprises timing means for returning to the comparing means output signal after a predetermined time period following the most recent sensing of actuator movement.

8. A lighting control system for controlling a fluorescent dimming ballast to adjust the brightness of a fluorescent lamp controlled by such ballast in accordance with the minimum lighting needs of an environment in which the lamp is used, said system comprising:
   (a) adjustable dimming means for producing a first signal having a value representing a first desired lamp brightness in said environment, said dimming means having a manually movable actuator for adjusting the value of said first signal;
   (b) occupant sensing means for sensing the absence of a human being in said environment and, in response to detecting such absence for a predetermined time interval, for selectively producing a second signal, said second signal having a value representing a second desired lamp brightness in said environment; and
   (c) a logic and control unit comprising: (i) means for comparing the respective values of said first and second signals and for producing an output signal to said ballast to cause the lamp to operate at the lower of the first and second desired lamp brightnesses, and (ii) means responsive to movement of said actuator for overriding the output of said comparing means to cause the lamp brightness to be determined only by said first signal, said logic and control means operating to change lighting levels at a preset rate when said second signal determines the desired lamp brightness, and at a faster rate when said first signal determines the desired lamp intensity.

9. The system as defined by claim 8 wherein said logic and control unit further comprises timing means for returning to the comparing means output signal after a predetermined time period following the most recent sensing of actuator movement.

10. A lighting control system for controlling the voltage applied to a fluorescent dimming ballast to adjust the brightness of a fluorescent lamp controlled by such ballast in accordance with the minimum lighting needs of an environment in which the lamp is used, said system comprising:
   (a) adjustable dimming means for producing a first signal having a value representing a first desired lamp brightness in said environment, said dimming means having a manually movable actuator for adjusting the value of said first signal;
   (b) occupant sensing means for sensing the absence of a human being in said environment and, in response to detecting such absence for a predetermined time interval, for selectively producing a second signal, said second signal having a value representing a second desired lamp brightness in said environment;
   (c) photosensing means for sensing the level of natural light in such environment and for producing a third signal having a value representing a third desired lamp brightness;and
   (d) a microprocessor-based logic and control unit comprising: (i) means for comparing the respective values of said first, second and third signals and for producing an output signal to said ballast to cause the lamp to operate at the lowest of the first, second and third desired lamp brightnesses, and (ii) means responsive to movement of said actuator for overriding the output of said comparing means to cause the lamp brightness to be determined only by said first signal, said logic and control means operating to change lighting levels at a preset rate when said second signal determines the desired lamp brightness, and at a faster rate when said first signal determines the desired lamp intensity.

11. The system as defined by claim 10 wherein said logic and control unit further comprises timing means for returning to the comparing means output signal after a predetermined time period following the most recent sensing of actuator movement.

12. A lighting control system for controlling the brightness of a lamp in accordance with the minimum lighting needs of an environment in which the lamp is used, said system comprising:
   (a) adjustable control means for producing a first signal having a value representing a first desired lamp brightness;
   (b) occupant-sensing means for sensing the absence of a human being in the environment and, in response to detecting such absence for a predetermined time interval, for selectively producing a second signal, such second signal having a value representing a second desired lamp brightness; and
   (c) a logic and control unit comprising: (i) means for comparing the respective values of the first and second signals and for producing an output signal to cause the lamp to operate at the lower of the first and second desired lamp brightnesses, and (ii) means responsive to a third signal indicating a need for full lamp brightness for overriding the output of the comparing means to cause the lamp brightness to be determined only by the third signal.

13. A lighting control system for controlling the power applied to a lamp to control the brightness of the lamp in accordance with the minimum lighting needs of an environment in which the lamp is used, said system comprising:
   (a) occupant-sensing means for sensing the presence of a human being in the environment;
   (b) logic and control means coupled to said occupant sensor for setting the lamp brightness at a first level when the presence of a human being is sensed, and for setting the lamp brightness at a second level lower than said first level when no such presence is sensed; and
   (c) a time clock for producing a signal indicating the time of day, said logic and control means being responsive to said time clock signal to set the lamp brightness to zero at certain times of day and to be set at said second level at other times of day when the environment is unoccupied.

14. The system as defined by claim 13 further comprising means for adjusting said first and second levels.

* * * * *